Patented Dec. 2, 1952

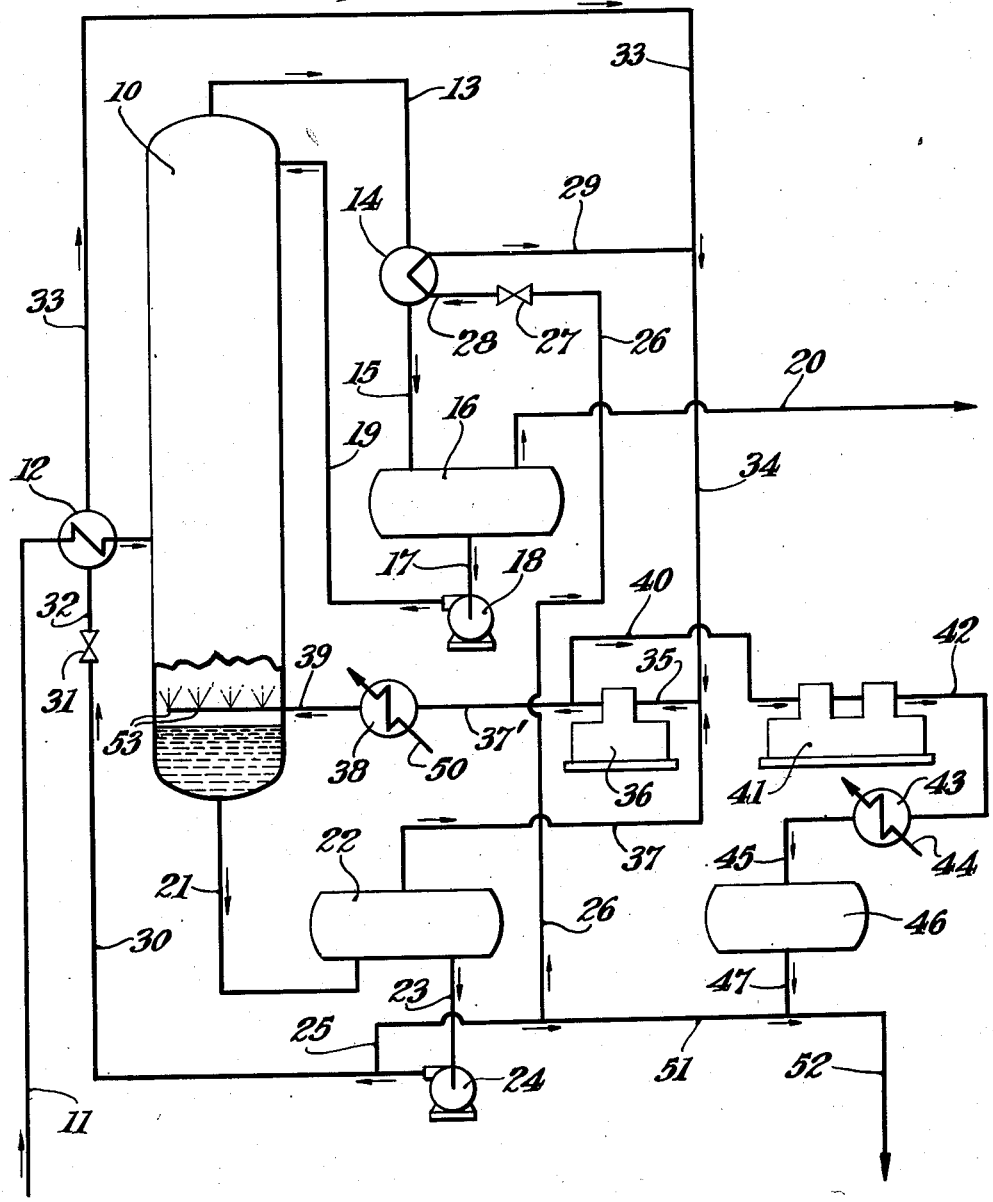

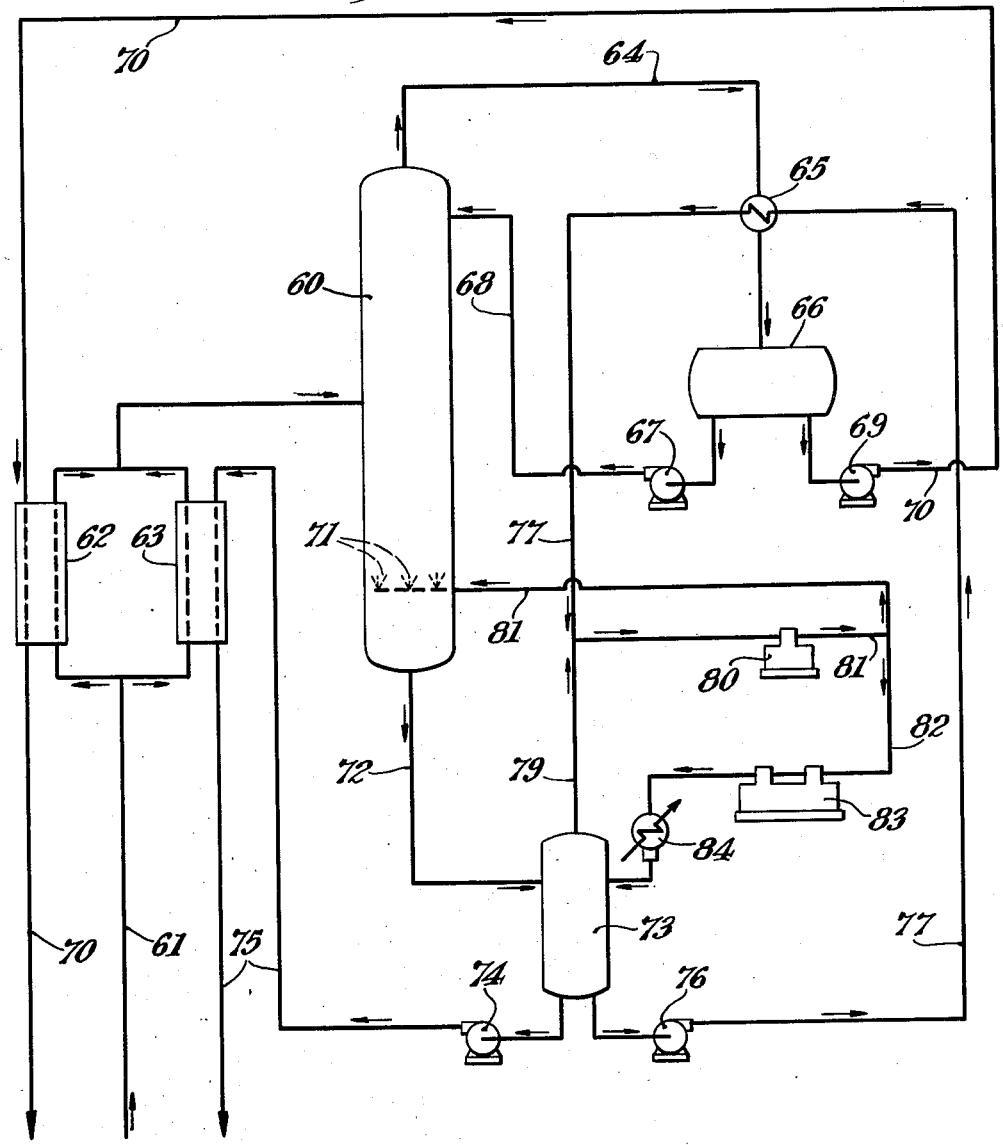

2,619,814

UNITED STATES PATENT OFFICE 2,619,814

FRACTIONAL DISTILLATION

Ludwig Kniel, Scarsdale, N. Y., assignor to The Lummus Company, New York, N. Y., a corporation of Delaware Application April 22, 1950, Serial No. 157,569

6 Claims. (Cl. 62—175.5)

This invention relates to fractional distillation and more particularly to a method and apparatus for the separation of mixtures of components of narrow boiling range such as normally gaseous hydrocarbons containing the same number of carbon atoms. These frequently require refrigeration for their separation.

Mixtures of narrow boiling range are usually separated by distillation under either high pressure using cooling water or low pressure using refrigeration to condense the overhead. In either case, steam may be used to supply the heat requirements at the base of the column. Neither method, however, is economically satisfactory as applied to mixtures of low boiling normally gaseous hydrocarbons. High pressure distillation has the obvious disadvantage of requiring expensive pressurized equipment. In addition, due to the low relative volatilities of the normally gaseous hydrocarbons at high pressures, a large number of plates are needed in the distillation tower and thus the tower is very expensive.

Low pressure distillation, on the other hand, is more economical since low pressure equipment may then be used throughout the installation. In addition, since the relative volatilities of the normally gaseous hydrocarbons are high at low pressure, a column of only a relatively small number of plates is required. However, there are several disadvantages to low pressure operation. Among these may be mentioned the necessity for using refrigerant to condense the volatile, low-boiling overhead. A modification of this low pressure method has been suggested for the separation of mixtures of normally gaseous hydrocarbons of narrow boiling range and this modification forms the basis of my invention. In the separation of such mixtures, the top and bottom temperatures in the distillation column are not very different and therefore, assuming the feed entering at its bubble point, the greater proportion of the heat added in the reboiler at the base of the column must be removed in the reflux condenser at the top of the tower. With the reflux ratios required to effect the separation of such mixtures, the heat removed in the reflux condenser, although less than the heat added in the reboiler tends to approach the latter. If on the other hand, the feed to the tower is superheated, the heat removed in the overhead-reflux condenser may be greater than that entering the tower in the reboiler. In either case, the difference between the heat removed by the reflux condenser and that required at the reboiler is mainly due to the difference in temperature and in mixtures of the type herein- before referred to, this difference is small. It is to be noted that the term "reboiler" etc. is used to include all means of introducing heat at the bottom of the tower and includes the introduction of a heated gas, i. e. direct as well as indirect heat transfer.

It will be apparent, therefore, that the heat recovered in the reflux condenser may be used to supply heat to the reboiler. This may be readily done by means of a heat pump system wherein the heat removed at one temperature level is transferred to a higher temperature level by the work of compression done on the heat transfer medium. Such a heat pump system may be combined with a distillation system. Considered thus, it becomes apparent that a fractionating system can function at low pressures without any large supply of outside utilities such as steam for the reboiler or cooling water for the reflux condenser which would otherwise be necessary. The heat pump system may be so designed that all or a part of the heat removed overhead in the distillation column will be delivered to the reboiler at a higher temperature.

A readily apparent defect in such a theoretically advantageous scheme is that, as described above, the heat pump will be operable only under the conditions for which it is designed. Changes in amount or composition of feed for the tower will necessitate changes in the operation of the heat pump system. These changes may be made by either adding or removing heat from the refrigeration system at some suitable point in the system.

It is therefore one of the principal objects of my invention to provide in a balanced fractionation system for the separation of closely boiling components, means whereby the heat liberated in the condensing overhead may be transferred to the bottoms liquid during an expansion of the latter, this heat being raised to the proper temperature level by means of subsequent compression of the expanded bottoms.

A second object of my invention is to decrease the requirements of steam and cooling water generally required in the separation of closely boiling mixtures.

Further objects and advantages of my invention will appear from the following description of a preferred embodiment of my invention taken in conjunction with Fig. 1 of the attached drawing which is a simplified flow diagram of a fractionation system. Fig. 2 shows an alternative method for accomplishing the result of this invention.

Referring to Fig. 1 of the attached flow sheet, 10 is a fractionating tower such as might be used for the separation of a multi-component mixture of normally gaseous hydrocarbons of a narrow boiling range. Such a mixture may be introduced to column 10 through line 11 and exchanger 12. The overhead vapors are removed through line 13 and thus pass through overhead condenser 14. The condensed reflux is passed through line 15 to reflux accumulator 16.

Pumped reflux is returned to tower 10 through line 17, pump 18, and line 19. Light gas product is removed through line 20.

The heavier material in tower 10 is passed through the lower stripping section where it is subjected to hot ascending gases as hereinafter described in detail. The bottoms are removed at 21 and passed to accumulator 22. From here a portion of the bottoms is passed through line 23, pump 24, line 25, and line 26 to expansion valve 27. Bottoms liquid is expanded through valve 27 and passed through line 28 to exchanger 14 where the expanded liquid removes heat from the condensing reflux and itself becomes vaporized. The expanded bottoms, now a gas, is passed off through line 29.

A second portion of the liquid bottoms is withdrawn from accumulator 22 and is passed through line 30 to expansion valve 31, line 32 and exchanger 12. Here the liquid is gasified by simultaneously cooling the feed to tower 10. A liquid level will generally be maintained in exchanger 12 as well as in exchanger 14.

The vaporized bottoms in lines 33 and 29, are combined and passed through lines 34 and 35 to compressor 36. Gas which has flashed off in accumulator 22 is passed through line 37 and joins line 34 at the junction thereof with line 35. The combined vapors are compressed in compressor 36, passed through line 37′, exchanger 38, line 39, and nozzles 53 into the lower part of column 10. Steam or cooling water is passed through line 50 of exchanger 38 to adjust the temperature of the gas in line 37′. The heat exchanger thus regulates or adjusts the temperature of the compressed bottoms in accordance with the requirements of the fractionation operation.

Heavy liquid product is withdrawn from accumulator 22 through line 23, pump 24, lines 25, 51, and 52. Additional liquid product is obtained by bleeding off compressed gas from line 37′ and passing it through line 40 to compressor 41. The gas removed through line 40 represents the excess present in line 37′ over that required to reboil tower 10. Line 42 leads to a condenser 43 cooled by cooling medium passing through line 44. The condensed additional production is then passed through line 45 to accumulator 46 and then through line 47 to be combined with the net heavy product passing through line 51 and 52.

In one embodiment of this invention, a feed consisting of the following was admitted to the system at a temperature of 90° F.:

| Component | Symbol | lbs./hr. | mols./hr. |
|---|---|---|---|
| Ethane | C$_2$ | 144 | 4.8 |
| Propylene | C$_3$= | 7,052 | 167.9 |
| Propane | C$_3$ | 13,402 | 304.6 |
| Butane | C$_4$ | 139 | 2.4 |
| | | 20,737 | 479.7 |

This material is cooled in exchanger 12 to a temperature of 1° F. and is then passed to propylene fractionator 10, which operates at about 23–24 p. s. i. g. Substantially pure propylene is removed at about 20 p. s. i. g. and −15° F. from the overhead and this is passed through line 13 to condenser 14 wherein it is condensed. Propylene liquid at a temperature of about −16° F. is passed from accumulator 16 through line 17, pump 18, and line 19 to tower 10. A reflux ratio of about 12:1 is maintained at the top of the tower. Net product, gaseous propylene, is withdrawn at a temperature of −16° F. through line 20. The composition of this is essentially as follows:

| Component | Symbol | lbs./hr. | mols./hr. |
|---|---|---|---|
| Ethane | C$_2$ | 144 | 4.8 |
| Propylene | C$_3$= | 6,258 | 149.0 |
| Propane | C$_3$ | 141 | 3.2 |
| | | 6,543 | 157.0 |

It is noted that this is better than 95% purity propylene.

The heavier components of the feed are stripped by the heated vapors entering the tower through nozzles 53 and the stripped liquid comprising substantially pure propane is removed from the tower bottoms at a temperature of about 0° F. This product which is removed through line 21, accumulator 22, line 23, pump 24, lines 25, 51, and 52 is composed of the following:

| Component | Symbol | lbs./hr. | mols./hr. |
|---|---|---|---|
| Propylene | C$_3$= | 794 | 18.9 |
| Propane | C$_3$ | 13,261 | 301.4 |
| Butane | C$_4$ | 139 | 2.4 |
| | | 14,194 | 322.7 |

This is very high purity propane as is apparent.

The liquid bottoms at 0° F. from line 21 is flashed to a lower pressure in accumulator 22 and the temperature drops here to about −24° F. A portion of the liquid is removed from accumulator 22 through line 23, pump 24, lines 25 and 26, and is passed to expansion valve 27, line 28, and condenser 14 wherein the bottoms liquid is expanded to a temperature of about −30° F., simultaneously condensing the propylene overhead. The expanded gases then leave the condenser 14 through line 29 at a temperature of about −30° F.

A second portion of the bottoms from accumulator 22 is passed through line 23, pump 24, and line 30 to expansion valve 31, line 32 and exchanger 12. Here the bottoms liquid is expanded to −30° F. while cooling the incoming fresh feed. This portion of the expanded bottoms in line 33 is combined with the gases in line 29 and these are combined with the flashed gases from accumulator 22 through line 37 at a temperature of about −24° F. The resulting gas is passed through compressor 36 which heats the gases to a temperature of about 28° F. This gas is then sent through lines 37′ and 39 and exchanger 38 to tower 10. Steam or cooling water is admitted through line 50 to exchanger 38 to adjust the temperature of compressed bottoms in accordance with the requirements of the fractionation operation.

When the heat available in the line 37′ is greater than that required to reboil the tower 10, a portion of the propane will be removed by means of line 40 and passed to compressor 41. Here the gases are compressed to such a pressure that they may be condensed with the available 100° F. cooling water in exchanger 43 and passed to product stream 52, where they are combined with the cooler stream to produce a propane product at about 52° F.

Thus it can be seen that it is possible to utilize the bottoms liquid to condense the overhead from a tower and also to reboil the tower.

Referring to Fig. 2 of the attached drawing, an alternate embodiment of this process is shown in which 60 represents a fractionating tower similar to tower 10. The fresh feed is introduced through line 61 and passes in parallel through exchangers 62 and 63 wherein it is cooled before being introduced to tower 60. Substantially pure propylene is removed from the tower through overhead line 64, totally condensed at 65, and passed to accumulator 66. Reflux is returned to tower 60 through pump 67 and line 68. Liquid propylene is removed from accumulator 66 through pump 69 and line 70. This stream in line 70 may be used to cool the feed by means of exchanger 62.

The heavier components of the feed are stripped by the heated vapors entering the tower through nozzles 71 and the stripped liquid comprising substantially pure propane is removed from the tower bottoms through line 72. It passes directly to surge drum 73 in which a portion may be flashed off. Propane product is removed through pump 74, line 75 and exchanger 63 wherein the propane helps to cool the incoming feed.

A second portion of liquid propane is removed from surge drum 73 through pump 76 and line 77 to exchanger 65 wherein it is evaporated as it cools the overhead. The vapor continues through line 77 to the inlet of compressor 80. Just prior to its entry into compressor 80, line 77 is joined by line 79 which carries the propane vapor flashed off in drum 73. The combined vapors are compressed in compressor 80 and passed through line 81 to the nozzles 71 in the tower 60. This compressed propane is used as the stripping medium for the tower 60.

Where the heat contained in the gas in line 81 at the discharge of compressor 80, is greater than the heat required to reboil the tower 60, a part of the compressed propane may be drawn off from line 81 through line 82 which joins line 81 adjacent to the outlet of the compressor 80. This is compressed in compressor 83, condensed at 84, and passed to accumulator 73. From here it will be passed out as additional liquid propane through line 74 as hereinbefore described. It is noted that generally compressor 83, shown as a two stage unit, will be of much smaller capacity than compressor 80. In the process as disclosed in Fig. 2 both products are adapted to leave the system as a liquid. The receiver 73 as well as the receiver 22 may be incorporated into the bottom of the towers 60 and 10 respectively if desired.

It is apparent that modifications may be made in this disclosure, and that the temperatures and pressures will vary depending on the type of feed and the degree of separation required. It is further apparent that it can be used to efficiently separate closely boiling materials, homologues, etc. It functions particularly efficiently on hydrocarbon mixtures containing gases such as ethane and ethylene, or propane and propylene, or butane and butylene. It is also of use in separating closely related gases such as ethane and propane. Further the feed to the unit at 11 may be either liquid or gas and the products may be either liquid or gaseous as desired.

While I have shown and described a preferred form of embodiment of my invention, I am aware that modifications may be made thereto and I therefore desire a broad interpretation of any invention within the scope of the following claims:

I claim:

1. The method of separating a mixture of light normally gaseous hydrocarbons into a light fraction and a heavy fraction which comprises passing said mixture to a fractionation operation, producing therein a gaseous overhead and a liquid bottoms, expanding a first portion of said liquid bottoms to a temperature below that of said mixture, passing said cooled expanded first portion of bottoms in indirect heat exchange relationship with said mixture thereby cooling said mixture prior to its admission to said fractionation operation and simultaneously vaporing said first portion of said bottoms liquid, expanding a second portion of said liquid bottoms to a temperature below that of said gaseous overhead, passing said cooled expanded second portion of bottoms in indirect heat exchange relationship with said gaseous overhead thereby condensing at least a part of said overhead and simultaneously vaporizing said second portion of bottoms liquid, combining said vaporized first portion and said vaporized second portion of bottoms to produce a combined vaporized bottoms, compressing said combined vaporized bottoms to a pressure and temperature greater than that in a lower point of said fractionation operation, passing said compressed vaporized bottoms to a lower point in said fractionation operation, thereby supplying heat thereto, removing a portion of said overhead as a light fraction, and removing a portion of said liquid bottoms as a heavier fraction.

2. The method of separating a mixture of light normally gaseous hydrocarbons into a light fraction and a heavy fraction which comprises passing said mixture to a fractionation operation, producing therein a gaseous overhead and a liquid bottoms, flashing off a gas from said bottoms, expanding a first portion of said liquid bottoms to a temperature below that of said mixture, passing said cooled expanded first portion of said liquid bottoms in indirect heat exchange relationship with said mixture thereby cooling said mixture prior to its admission to said fractionation operation and simultaneously vaporizing said first portion of said bottoms liquid, expanding a second portion of said liquid bottoms to a temperature below that of said gaseous overhead, passing said cooled expanded second portion of bottoms in indirect heat exchange relationship with said gaseous overhead thereby condensing at least a part of said overhead and simultaneously vaporizing said second portion of said bottoms liquid, combining said flashed-off gas with said vaporized first portion and said vaporized second portion of bottoms to produce a combined vaporized bottoms, compressing said combined vaporized bottoms to a pressure and temperature greater than that in a lower point of said fractionation operation, passing said compressed vaporized bottoms to said lower point in said fractionation operation thereby supplying heat thereto, removing a portion of said overhead as a light fraction, and removing a portion of said flashed bottoms as a heavier fraction.

3. The method of separating a mixture of light normally gaseous hydrocarbons into a light fraction and a heavy fraction which comprises passing said mixture to a fractionation operation, producing therein a gaseous overhead and a liquid bottoms, passing a first portion of said liquid bottoms in indirect heat exchange relationship with at least a part of said mixture thereby cooling same prior to its admission to said fractionating operation, expanding a second portion of said liquid bottoms to a temperature below that of said overhead, passing said cooled expanded second portion of bottoms in indirect heat exchange relationship with said gaseous overhead thereby totally condensing said overhead and simultaneously vaporizing said second portion of bottoms liquid, compressing said vaporized bottoms to a pressure and temperature greater than that in a lower point of said fractionation operation, passing said compressed vaporized bottoms to a lower point in said fractionation operation thereby supplying heat thereto, removing a portion of said liquid bottoms as a heavy fraction, and removing a portion of said liquid overhead as a light fraction.

4. The method of separating a mixture of light normally gaseous hydrocarbons into an olefinic fraction and a paraffinic fraction which comprises passing said mixture to a fractionation operation, producing therein a gaseous olefin overhead and a liquid paraffin bottoms, expanding a portion of said liquid bottoms to a temperature below that of said gaseous overhead, passing said cooled expanded bottoms portion in indirect heat exchange relationship with said gaseous overhead thereby condensing at least a portion of said overhead and simultaneously vaporizing said bottoms liquid, compressing the vaporized bottoms to increase the pressure and temperature thereof, thereafter adjusting the temperature of said compressed bottoms by indirect heat exchange, discharging said temperature adjusted compressed bottoms to the lower part of said fractionation operation to supply controlled heat thereto and to strip lighter fractions from the feed to said fractionation operation, removing a portion of said condensed overhead as an olefinic fraction and removing a portion of said liquid bottoms as a paraffinic fraction.

5. The method of separating a mixture of light normally gaseous hydrocarbons claimed in claim 4 wherein said mixture comprises propane and propylene.

6. The method of separating a mixture of light normally gaseous hydrocarbons into a light fraction and a heavy fraction which comprises passing said mixture to a fractionation operation producing therein a gaseous overhead and a liquid bottoms, passing said liquid bottoms to a surge drum, flashing off a portion of said bottoms therein, passing a first liquid portion of said bottoms in indirect heat exchange relationship with said mixture thereby cooling said mixture prior to its admission to said fractionation operation, passing a second liquid portion of said bottoms in indirect heat exchange relationship with said gaseous overhead thereby condensing said gaseous overhead, simultaneously vaporizing said second portion of bottoms liquid and combining said flashed portion and said vaporized second portion of bottoms to produce a combined vaporized bottoms, compressing said combined vaporized bottoms to a pressure and temperature greater than that in the lower part of said fractionation operation, passing said compressed vaporized bottoms to a lower point in said fractionating operation thereby supplying heat hereto, removing a portion of said condensed overhead as a light fraction, passing said removed light fraction in indirect heat exchange relationship with said mixture thereby cooling the mixture prior to its admission to said fractionation operation and removing a portion of said liquid bottoms as a heavier fraction.

LUDWIG KNIEL.

REFERENCES CITED

The following references are of record in the file of this patent:

UNITED STATES PATENTS

| Number | Name | Date |
|---|---|---|
| 2,327,643 | Houghland | Aug. 24, 1943 |